E. TYDEN.
EXTENSION TABLE LOCKING DEVICE.
APPLICATION FILED MAY 20, 1907.
900,239.
Patented Oct. 6, 1908.
6 SHEETS—SHEET 1.
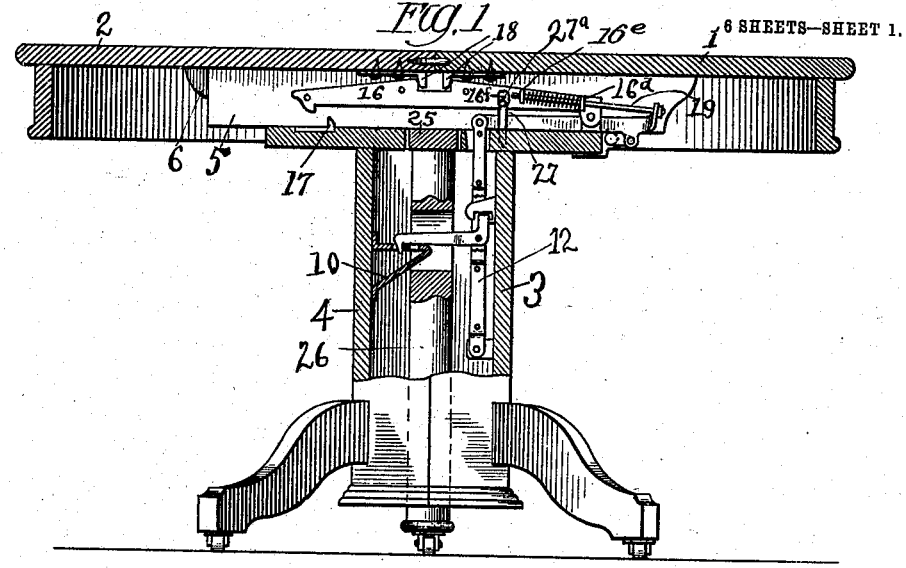
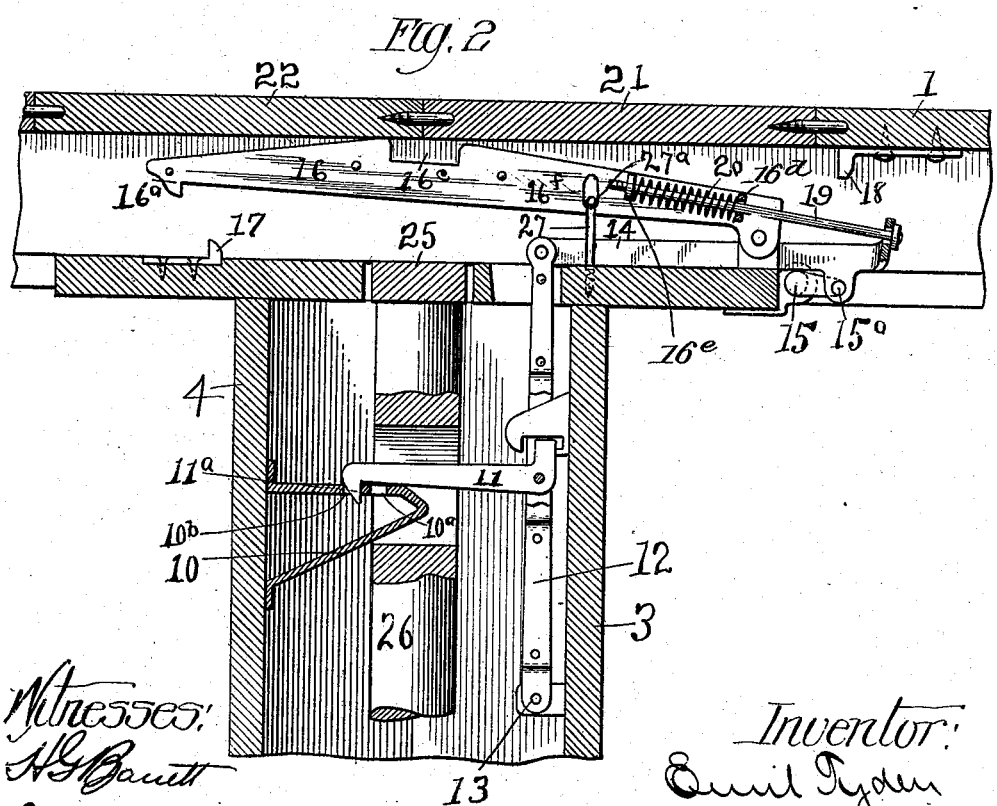

E. TYDEN.
EXTENSION TABLE LOCKING DEVICE.
APPLICATION FILED MAY 20, 1907.
900,239.
Patented Oct. 6, 1908.
6 SHEETS—SHEET 2.
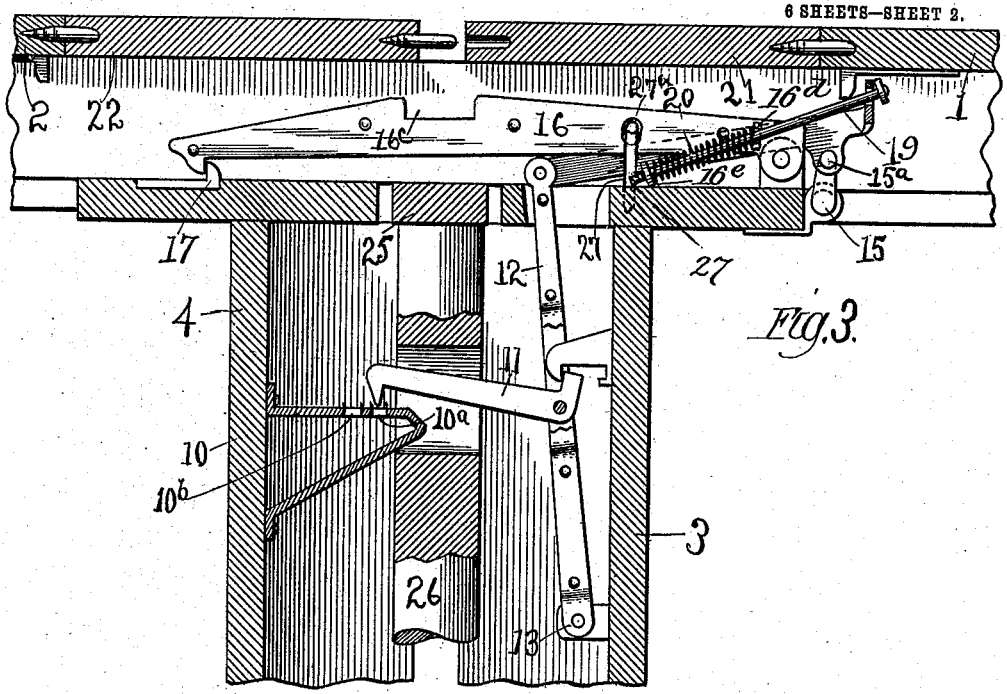
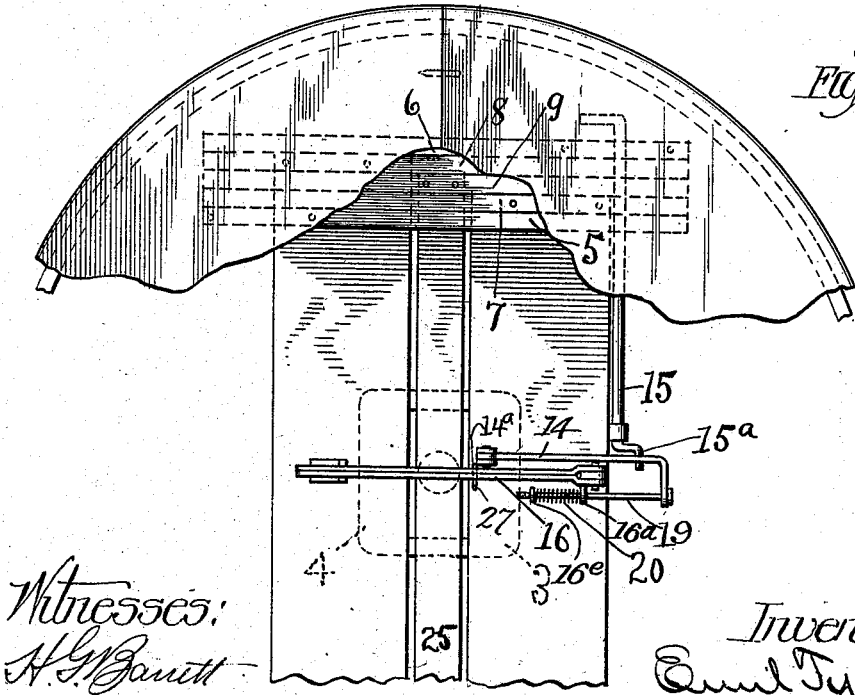

E. TYDEN.
EXTENSION TABLE LOCKING DEVICE.
APPLICATION FILED MAY 20, 1907.

900,239.

Patented Oct. 6, 1908.

6 SHEETS—SHEET 3.

Witnesses:
Inventor:

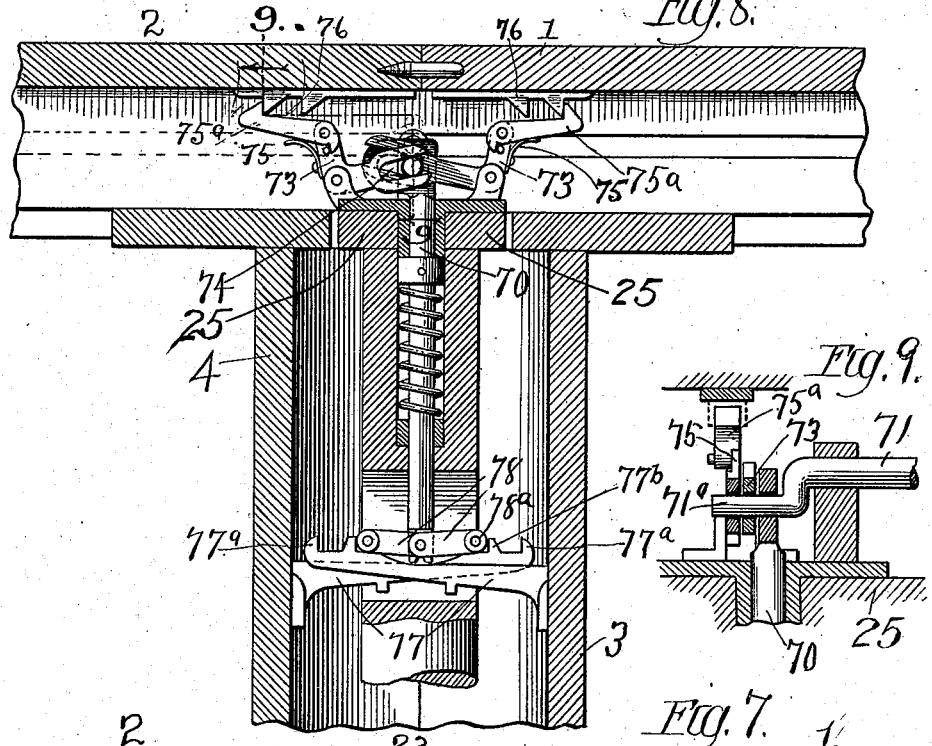
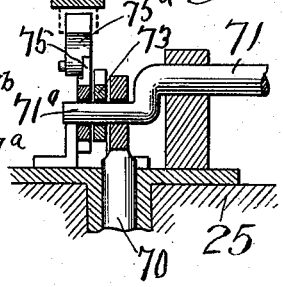
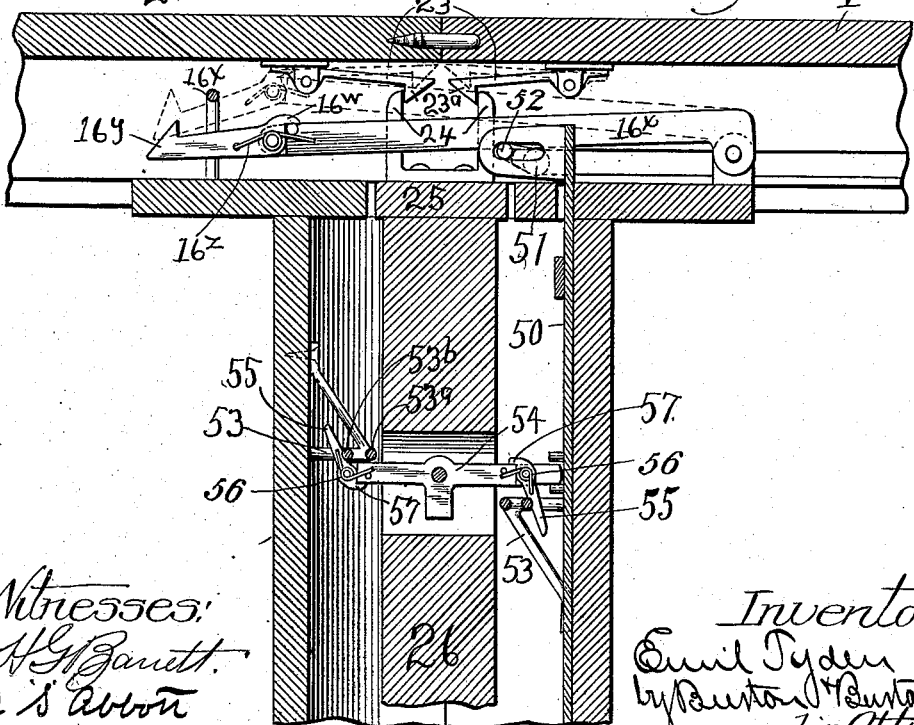

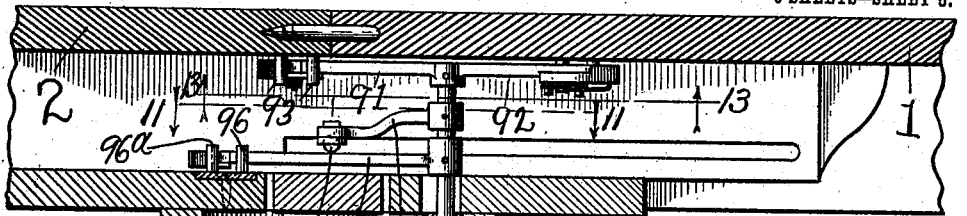

E. TYDEN.
EXTENSION TABLE LOCKING DEVICE.
APPLICATION FILED MAY 20, 1907.
900,239.
Patented Oct. 6, 1908.
6 SHEETS—SHEET 6.
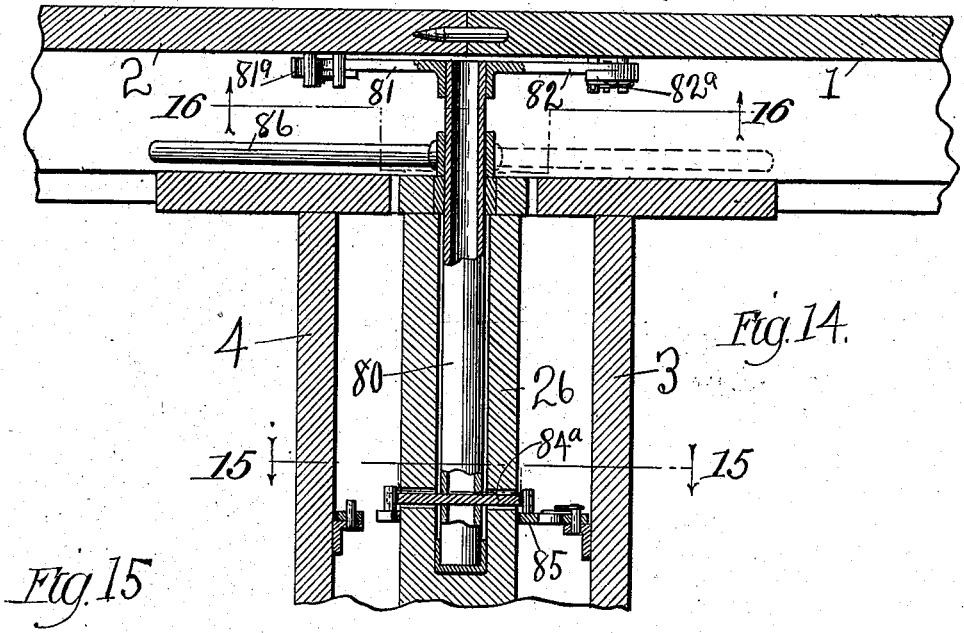
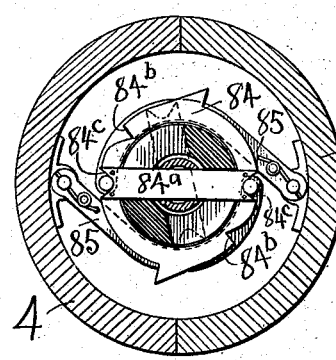
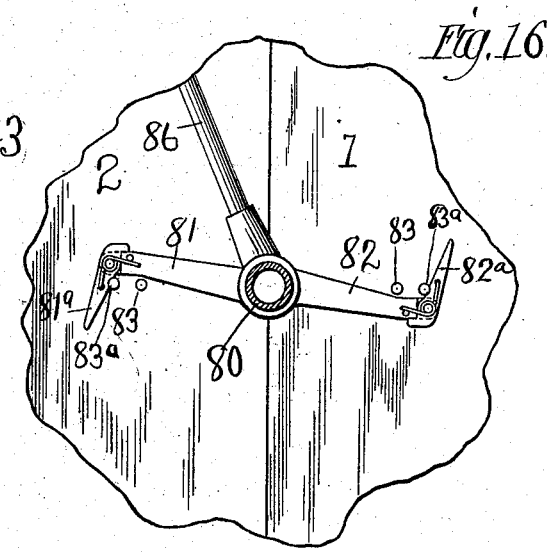
Witnesses:
H. G. Barrett
J. S. Aubin
Inventor:
Emil Tyden
by Burton & Burton
his Attys

UNITED STATES PATENT OFFICE.

EMIL TYDEN, OF HASTINGS, MICHIGAN.

EXTENSION-TABLE-LOCKING DEVICE.

No. 900,239.    Specification of Letters Patent.    Patented Oct. 6, 1908.

Application filed May 20, 1907. Serial No. 374,554.

*To all whom it may concern:*

Be it known that I, EMIL TYDEN, a citizen of the United States, residing at Hastings, in the county of Barry and State of Michigan, have invented new and useful Improvements in Extension-Table-Locking Devices, of which the following is a specification, reference being had to the accompanying drawings, forming a part thereof.

The purpose of this invention is to provide improved means for accomplishing two purposes which are of special importance in a pedestal extension table which has provision for extending the table top without opening or extending the pedestal in order that extension-leaves may be included in the table top with unextended pedestal;—to wit, first, the purpose of locking the pedestal for holding the two members of the table securely closed with the interposed extension leaves; second, for drawing the pedestal together in repeated step-by-step action so that the parts may be engaged at a greater distance than can be covered by a single step of the action of convenient sized operating parts. Incidentally also it has the purpose of providing an improved convenient means for operating a pedestal locking device from the side.

The invention consists in the elements and features of construction which are shown and described as indicated in the claims.

Figure 5:
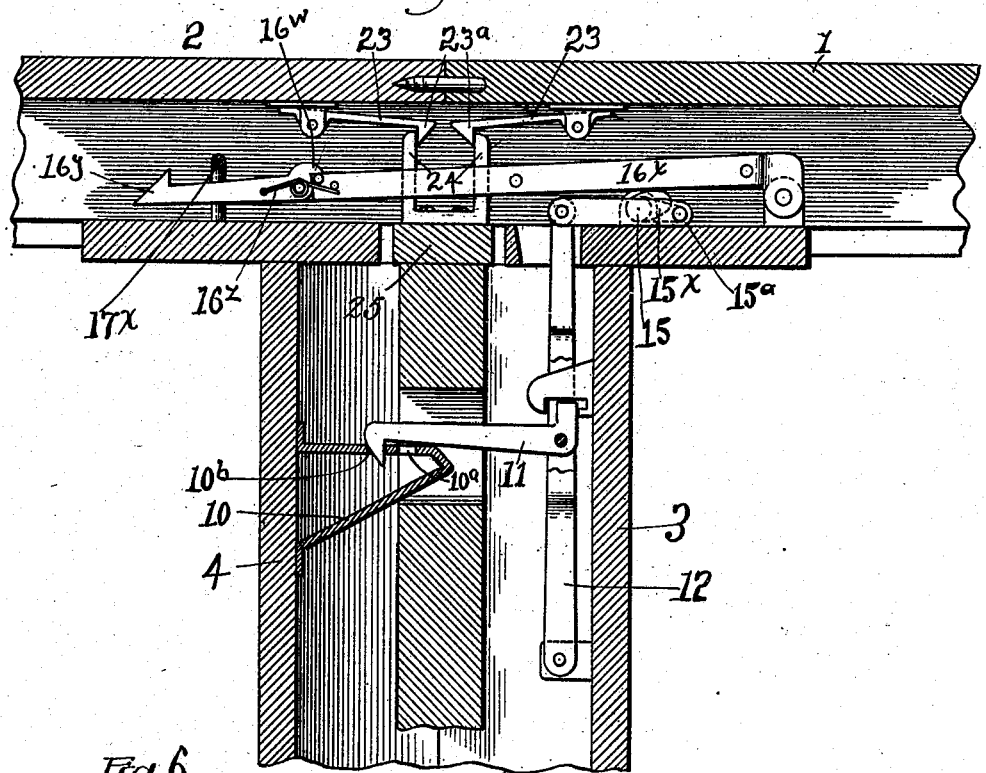
Figure 6:
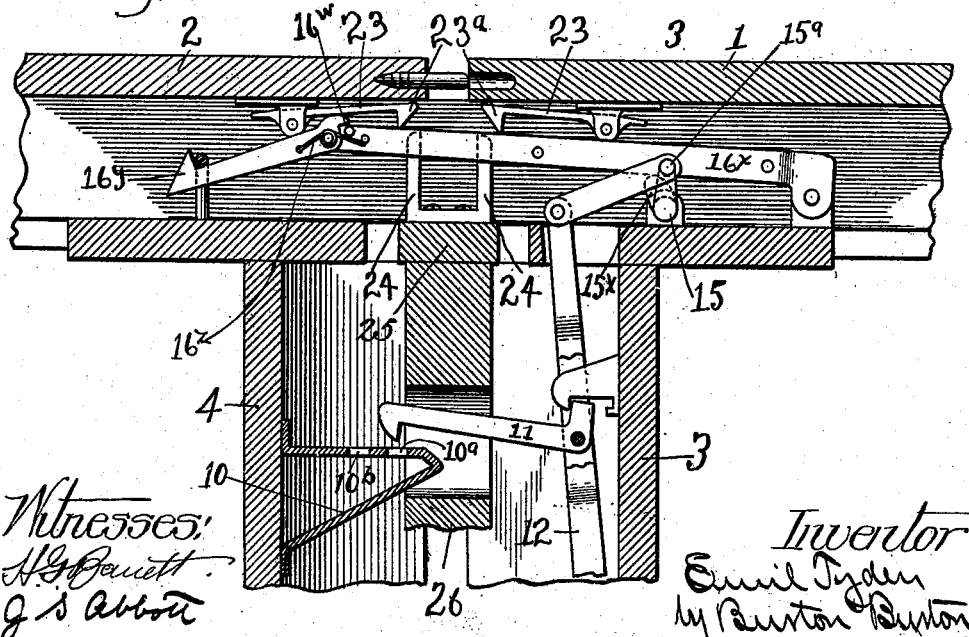

In the drawings:—Figure 1 is a vertical longitudinal section of a table having a pedestal locking device operated by an upstanding lever, the table being shown in closed position without the extension leaves. Fig. 2 is a similar view showing the pedestal locked and the table top closed together with the inserted extension leaves. Fig. 3 is a view similar to Fig. 1 showing the parts in the position occupied after inserting the extension leaves and before the table is closed and secured by the locking devices. Fig. 4 is a top plan view of the pedestal and operating mechanism with the table top broken away. Fig. 5 is a detail section similar to Fig. 1 showing a modification of certain details. Fig. 6 is a similar view of the same form with the parts in position corresponding to Fig. 3. Fig. 7 is a view similar to Fig. 1 showing this invention applied in connection with a table locking device in which the pedestal lock is operated by a vertically reciprocating element mounted on one pedestal member. Fig. 8 is a similar view showing a leading feature of this invention applied to a table in which a pedestal lock is operated by a vertical reciprocating element mounted on the center leg. Fig. 9 is a detail section at the line 9—9 on Fig. 8. Fig. 10 is a similar view showing a leading feature of the invention applied to a table having the pedestal locking device operated by a vertical rock shaft mounted on one pedestal member. Fig. 11 is a detail plan view at the line 11—11 on Fig. 10. Fig. 12 is a section at the line 12—12 on Fig. 10 looking upward. Fig. 13 is a section at the line 13—13 on Fig. 10. Fig. 14 is a view similar to Fig. 1 showing a leading feature of the invention applied to a table having a pedestal locking device operated by a vertical rock shaft mounted on the center leg. Fig. 15 is a section at the line 15—15 on Fig. 14. Fig. 16 is an inverted section at the line 16—16 on Fig. 14 showing the top not entirely closed.

Referring to any of the forms shown in the drawings, the two members, 1 and 2, of the table top, instead of being secured directly and rigidly to the corresponding members, 3 and 4, of the pedestal, are secured to the inner and outer slides, 5 and 6, so that the range of extension of the top which these slides afford by their range of longitudinal movement respectively with relation to the slides, 7 and 8, adjacent to them respectively, can be obtained without affecting the position of the two members of the pedestal, said pedestal members being secured respectively to said slides, 7 and 8, the middle slides, 9, (of which only one is shown) being connected by the cross bar, 25, carrying the center leg, 26, as in the more familiar construction of pedestal extension tables. It will be seen, therefore, that five slides in each set,—that is, upon each side of the table,—(one set only being shown—see Fig. 4) constitute a minimum number for this construction.

Disregarding the table top and considering only the two members of the pedestal attached respectively to the slides, 7 and 8, and inclosing the center leg carried by the middle slides, 9, any of the familiar forms of pedestal-locking devices may be employed for closing up the pedestal, and the present invention is shown in forms suitable for employment with the several types of pedestal-locking devices such as are shown in the several patents mentioned, but it will be understood that it is not limited to use in connection with these particular types of pedestal locking devices, but with suitable modifications which any mechanic may easily construct, it is designed to be used in connection with any pedestal table locking device.

The parts of the structure which while well adapted for the present invention constitute also parts of the locking device for locking the pedestal without regard to the separate extensibility of the top, are in certain respects modified in form in order to serve also the purpose of the present invention, as will be observed in the detail description of said parts. On the pedestal member, 4, there is mounted a bracket, 10, constituting one of the two engageable devices for holding the two pedestal members together. For the specific purpose of the present invention, this bracket is provided with two points of engagement, consisting in the two apertures, $10^a$ and $10^b$, at different distances from the opposite pedestal member. The hook latch, 11, is pivotally mounted on the lever arm, 12, fulcrumed at its lower end at 13 on the pedestal member, 3, and extending upward therefrom for connection at its upper end with the operating link, 14. The construction in this respect is substantially that shown in my said patent, the nose, $11^a$, of the hook latch being adapted for engagement with each of the apertures, $10^a$ and $10^b$, of the bracket, 10, and intended to engage them successively for drawing the two pedestal members together by two steps, as hereinafter more particularly explained, the said double-apertured bracket, 10, operating, it will be observed, substantially as a ratchet in engagement with the latch operating as a pawl for step-by-step engagement and drawing action for closing up the pedestal.

Inasmuch as the table top is to be extended beyond the pedestal when the additional leaves are inserted, it is not practicable to mount the device which is to be reached by the operator in closing up the table and releasing the locking devices thereof, directly on the table top, nor to locate it so that it shall be reached at the end of the table, since the distance of that end from the pedestal center would be too great when the extension leaves are inserted if the said device were mounted on the pedestal at the end. I therefore provide for operating the locking device a rock shaft, 15, mounted on the pedestal member, 3, extending crosswise,—that is, in the direction of the plane of parting of the two table members, so as to be reached at the side of the table. A crank, $15^a$, on said rock shaft engages the link, 14, for operating the latter and is in position to be rocked past the center for locking the device in substantially the same manner as the locking device shown in my said Patent No. 765,644.

To the same pedestal member upon which the rock shaft, 15, is mounted there is pivotally connected a latch, 16, which extends across the parting plane, and at its end remote from its pivot has a nose, $16^a$, for engaging an abutment, 17, mounted upon the opposite pedestal, 4. In the upper edge of the latch, 16, about midway in its length, there is formed a sloping-shouldered notch, $16^c$, and upon the under side of each of the members, 1 and 2, of the table top there is secured an abutment, 18, said abutments being near the meeting edges of said table-top members and adapted to be both engaged with the notch, $16^c$, when the two table-top members are closed together. On the latch, 16, there is an offset eye, $16^d$, directly above its fulcrum on the pedestal member, 3. A rod, 19, connected loosely to the operating link, 14, extends inward through the eye, $16^d$, and on its threaded end portion has a stop nut, $16^e$, a spring, 20, being coiled on the rod, 19, between the stop nut and the eye, $16^d$, for yieldingly resisting the outward pull of the rod, 19, through the eye. A bracket, 27, upstanding from the top of the pedestal alongside the latch, 16, has a projecting stud, $27^a$, which engages a slot, $16^f$, in the latch, 16, permitting a limiting vertical movement of the lever about its fulcrum.

The operation of the structure described for the purpose indicated is as follows:— When the table is closed together without the extension leaves and locked in its closed position, the nose, $11^a$, of the latch, 11, is engaged in the inner aperture, $10^b$, of the bracket, 10, and the latch or lever, 16, is held yieldingly up against the under side of the table top by the pull of the rod, 19, operating through the spring, 20, against the eye, $16^d$, which is sufficiently above the fulcrum of the lever to rock it, as stated, upward, so that its notch, $16^c$, engages both the abutments, 18, on the two members of the table top, preventing the extension of the latter. Upon the operator rocking the shaft, 15, for disengaging the latch, 11, from the bracket, 10, the link, 14, being moved inward releasing the spring, 20, permits the latch, 16, to fall, so as to withdraw its notch, $16^c$, from engagement with the abutments, 18, on the table top. The operator may now spread the members, 1 and 2, of the table top to the extent permitted by the range of movement of the slides, 5 and 6, to which they are respectively attached with respect to the adjacent slides, 7 and 8. In order to prevent the pedestal members from being widely separated in this action and yet to permit them to be sufficiently separated to allow room for the dowel on the two table members and the inserted leaves, the length of the latch, 16, from its fulcrum to the shoulder of its hook nose, $16^a$, is such that said shoulder or hook nose stands outside of the abutment, 17, at a little distance therefrom when said latch, 16, is dropped, as above described, by the action for releasing the latch, 11, and the pedestal members are thereby prevented from separating farther than the short distance intervening between the abutment, 17, and the shoulder of the nose, 16$^a$; and the distance to which the pedestal members may be thus spread is such that the nose, 11$^a$, of the latch, 11, is still in position for engaging the aperture, 10$^a$, of the bracket, 10. The two extension leaves, 21, 22, being now placed in position between the table members, 1 and 2, the operator will operate the rock shaft, 15, in the usual manner for closing up the pedestal. At the first action of the rock shaft, the nose, 11$^a$, of the latch, 11, being engaged with the notch, 10$^a$, will draw the pedestal members together, carrying also the table-top members, 1 and 2, a distance sufficient upon the reversing of the rock shaft to bring the nose, 11$^a$, into engagement with the notch, 10$^b$, and upon a second operation of the rock shaft the pedestal will be completely closed and locked and the table top will also be closed, the members, 1 and 2, embracing between them the inserted leaves, 21 and 22, all the joints being tightly closed up. The table may now be moved about the floor bodily without danger of extending or opening the joints, precisely as this may be done in the more familiar form of extension table when it is closed and locked without inserted leaves.
When it is desired to remove the inserted leaves, the lock will be released by reversing the movement of the rock shaft in the obvious manner. The table members will be pulled apart to the distance permitted by the latch, 16, in its relation to the abutment, 17, which is sufficient to disengage all the dowel joints. The two top members being then pushed together, if the pedestal has already been locked, the abutments, 18, will ride up on the upper edge of the latch, 16, which slopes upwardly from both ends to the opposite margins of the notch, 16$^c$, and when the table members are completely closed together the abutments will snap into the notch. If the members are closed together before locking the pedestal, the action of locking will yieldingly,—by the action of the spring, 20,—swing the latch upward against the abutments which it will engage in the notch, 16$^c$, upon the complete closing up of the pedestal.

If it is desired to extend the table so as to receive more extension leaves than those which can be contained without extending the pedestal, the operator having first released the locking devices and spread the table top members as if for insertion of the leaves which could be thus inserted without extending the pedestal, will thereby obtain access to the latch, 16, which he may then disengage by hand from the abutment, 17, at the same time spreading the pedestal members until the nose of the latch clears the abutment, and the pedestal may thereupon be further extended to the limit of the slides for the reception of additional leaves.

A modification of the detail devices for closing and locking together the table top members by the closing up of the pedestal members is shown in Fig. 5, in which, instead of the latch, 16, there is shown a hook-nosed latch, 16$^x$, which is swung downward instead of upward by the locking action of the pedestal locking devices,—the cam, 15$^x$, provided on the operating shaft, 15, for actuating the latch being positioned to cause this reversal of movement,—and which is engaged with and disengaged from an abutment, 17$^x$, on the opposite pedestal member, corresponding to the abutment, 17, in the form first described, by the corresponding movements of the locking device; that is, the latch being moved into position for engagement by the pedestal-unlocking movement and out of engaging position by the pedestal-locking movement. For operating and securing the table top members, each of them is provided with a latch, 23, having a downwardly projecting hooked nose, 23$^a$, for engagement with an abutment, 24, on the cross bar, 25, the engagement being effected by gravity and the latch nose being sloped to permit it to ride over the abutment in approaching it from the outer side. The latch, 16$^x$, when lifted in the unlocking movement encounters by its upper edge the depending noses of the latches, 23, and lifts them free of the abutments, 24. When the pedestal locking devices are operated for locking before the table top members are closed up and while the latches, 23, are outside the abutments, 24, the latch, 16$^x$, being depressed, the latches, 23, are in position for encounter of their sloping noses, 23$^a$, with the abutments when afterward the table top members are closed together. Since the latch, 16$^x$, in this form is positively lifted and upheld by the cam, 15$^x$, on the operating rock shaft, provision is made for disengaging it when the table is to be extended to an extent requiring the spreading of the pedestal by pivoting the hooked nose, 16$^y$, to the latch, 16$^x$, and providing a spring, 16$^z$, operating to hold it extended limited by the stop, 16$^w$, and permitting it to fold down for passing under the staple. This device in this form, like the yielding connection of the latch, 16, in the form shown in the preceding figures, operates to prevent accident or injury to the parts in case by oversight the pedestal locking device should be operated for locking before closing the pedestal together, the latch in each instance in such case being adapted to yield past the abutment and become engaged behind it with the necessary range of play for permitting the part to open the pedestal as described.

This invention is applicable to substantially all the forms of pedestal locking devices heretofore employed, and I have shown it in the drawings as applied to typical forms of the existing pedestal locking devices. The first form already described will be recognized as one in which the pedestal locking devices are operated by an upstanding lever swinging transversely to the parting plane to operate the lock. The following additional forms will be recognized in the different views. Second: In which the pedestal devices are operated by a vertical reciprocating rod mounted on one pedestal member, an instance of which is seen in my Patent No. 733,607, dated July 14, 1903. Third: In which the pedestal locking devices are operated by a vertically reciprocating element mounted on the center leg, as seen in my Patent No. 707,186, dated August 19, 1902. Fourth: In which the pedestal devices are operated by a vertical rock shaft mounted on one pedestal, as seen in Patent No. 747,132, dated December 15, 1903. Fifth: In which the pedestal locking devices are operated by a vertical rock shaft mounted on the center leg, as seen in my Patent No. 754,399, dated March 8, 1904. In several of these classes the pedestal locking devices are or may be operated by a horizontal rock shaft mounted on one pedestal member or on the center-leg-carrying element, and nearly all other types not specified may be defined as being adapted to be operated in this manner.

I have illustrated the invention as applied to a pedestal table locking device of each of the types above indicated, and these will now be briefly described in the above order.

In Fig. 7 a pedestal table locking device substantially as shown in my Patent No. 733,607 is partially illustrated, and as a pedestal locking device proper need not be described here beyond mere statement of the fact that the lock is operated by the vertical reciprocation of the bar, 50. It will be seen that in my said Patent No. 733,607, this bar, 50, is shown operated by a longitudinally extending rock shaft mounted on the table top. The only change in this respect necessary in order to apply the present invention to this type of pedestal lock is to mount the rock shaft transversely on one of the pedestal members instead of longitudinally on the table top, and the rock shaft, 51, is so shown, engaging by its crank arm, 52, the vertically reciprocating rod, 50. It will be seen that the transverse rock shaft, 51, thus substituted is in approximately the same position as the rock shaft, 15, in the form of the device first above described shown in Figs. 1 to 4 inclusive, and in the modification illustrated in Figs. 5 and 6; and that since all the top locking devices shown in said figures derive their action from this rock shaft, no change is necessary in order to apply them to the type of pedestal lock shown in Fig. 7 when the operating rock shaft of that type has been transposed to transverse position, as illustrated. The form shown in Figs. 5 and 6 is more exactly applicable. For applying to this form of lock the expedient for step-by-step action for drawing the members together, the bracket, 53, for engagement of the pedestal locking latch, 54, may be made substantially in the same form as the corresponding element, 10, of the form shown in Figs. 1 to 4 inclusive; that is, with two apertures and bars for engagement of the hook nose with the latch, and said hook nose, 55, may be pivoted to the latch bar and provided with a spring, 56, intended to throw it to a stop, 57, and permitting it to be folded back toward the latch bar when the latch is rocked for disengagement after engaging with the first bar, 53ª, of the bracket, 53, reacting under the influence of the spring so as to be in position to engage the second bar, 53ᵇ, upon the second step action of the locking device.

In Fig. 8 I have shown this invention applied to a pedestal table locking structure shown in my Patent No. 707,186, in which the pedestal locking device is operated by a vertically reciprocating element mounted on the center leg. This reciprocating element, the rod, 70, in my said patent is shown operated by a longitudinally extending rock shaft mounted on the table top and coming into engagement with the reciprocating rod only when the table is nearly closed together. In applying the present invention, I mount the operating rock shaft, 71, transversely instead of longitudinally and upon the center-leg-carrying bar, 25, instead of upon the table top, so that it remains at all times in engagement. The pedestal locking device is operated for closing the pedestal at the lower part by thrusting the rod, 70, downward, and for closing the table top members by the same movement there may be provided two bell-crank levers, 73, 73, mounted upon the center-leg-carrying bar, 25, having horizontal arms extending from opposite directions toward the parting plane and having slots, 74, engaged by the crank wrist, 71ª, of the rock shaft. When the rod, 70, is at pedestal-locking position, the upstanding arms, 75, of the bell-crank levers hold the latches, 75ª, pivoted on them in position to engage or be engaged by the abutments, 76, 76, carried by the table top members respectively in such position that the rocking of the bell-crank levers caused by the down thrust of the rod, 70, to the locking point of the pedestal-locking devices will draw the table-top members together at their meeting edges. If the pedestal should be locked before the table top members are brought together, or closely enough together to be thus engaged by the upstanding arms of the bell-crank levers, the subsequent sliding together of these table top members will cause the latches, 75$^a$, to yield and pass the abutments and engage them; or if the fit should be too close to permit them to freely engage the abutments, the operator reversing the rock shaft, 71, will cause the upstanding arms of the bell crank levers to tip outward until the latches become engaged, and the rocking movement of the rock shaft being then performed, the top and pedestal will be both locked simultaneously. For adapting this form of table lock to the step-by-step action for drawing the members together, the brackets, 77, 77, which are engaged by the links, 78, 78, when the rod, 70, is thrust downward for drawing the pedestal parts together by the spreading of the links, 78, which results from the down thrust of their pivot after the studs, 78$^a$, have engaged the brackets, may be provided with a plurality of notches with engaging shoulders, 77$^a$, 77$^b$, the shoulders, 77$^a$, being engaged upon the first step action if the members are considerably spread, and the shoulders, 77$^b$, being engaged by the second step action after the members are drawn together to the extent which one thrust of the rod, 70, can effect. The abutment, 76, on the table top members may for like purpose be double-toothed, or ratcheted as shown.

In Figs. 10, 11, 12 and 13 this invention is shown applied to a type of table lock such as shown in Patent No. 747,132, in which there is employed for operating the locking devices a vertical rock shaft, 90, mounted on one of the pedestal members and operated by a link, 90$^x$, connected to a lever arm, 90$^y$, at the top of the shaft. In order to draw and lock together the table top members by the locking action of the pedestal locking devices and release them by the releasing action of the latter, there may be provided upon the upper end of the rock shaft, 90, two lever arms, 91, 92, which are of the nature of hooks or latches with drawing ends or noses adapted to engage studs, 93, 93, on the table top members respectively when the shaft is rocked for operating the pedestal lock, and by such engagement of the studs to crowd the table top members together if they are not closed and to secure them in locked position if they are closed. For the step-by-step movement of both the pedestal locking device and the top locking device in this form, substantially the same expedient may be employed as described in respect to the form shown in Fig. 6, though the operation of the hooks is horizontal instead of vertical. That is to say, the pedestal locking latches or hooks, 95, 95, at top and bottom may have their sloping noses, 95$^a$, formed of a separate piece pivoted to the main latch bar and controlled by a spring swinging them open to a stop, 95$^b$, and two studs, 96, 96$^a$, may be provided on the pedestal for successive engagement of the latch nose upon successive actions, thus drawing together the pedestal a step at a time, the last step leaving it in completely closed position. The top locking latches or lever arms, 91, 92, may similarly have their engaging noses, 91$^a$, 92$^a$, pivoted to the main body of the latches respectively and controlled by springs, 91$^b$, tending to swing the latches out to stops, 92$^b$, and a second pair of studs, 93$^a$, may be provided for the second step engagement of the top locking latches. In this form, in order to operate the vertical rock shaft with equal convenience, whether or not the table is extended by the insertion of the leaves which may be inserted without extending the pedestal, the link, 90, which operates said rock shaft may be extended transversely so as to be reached and operated at the side of the table.

In Figs. 14, 15 and 16 this invention is shown applied to a table locking structure of the type shown in Patent No. 754,399, March 8, 1904, in which the pedestal locking devices are operated by a vertical rock shaft, 80, mounted on the center leg. The action for drawing and locking the table top members in this structure may be identical with that shown in the last described structure,—Figs. 10 to 13 inclusive,—comprising the lever arms, 81, 82, with their pivoted spring-controlled noses, 81$^a$, 82$^a$, engaging studs, 83, 83$^a$, on the table top members. For the step-by-step action of the pedestal locking device the ring, 84, which is carried by the cross bar, 84$^a$, on the vertical rock shaft, 80, has a plurality of ratchet teeth, 84$^b$, 84$^c$, for successive engagement of the swinging latches, 85, 85, as the rock shaft is given successive rocking action for the step feeding action to close up the table. The rock shaft, 80, in this structure is operated by a transversely extending lever arm, 86, accessible at the side of the table, and there adapted to be swung through the necessary arc of about sixty degrees for each step action of the locking process.

I claim:—

1. In combination with a pedestal extension table, a device for locking the two members of the pedestal together; an additional device for locking together the two members of the table top; means for operating the pedestal-locking device for releasing, and connections between such operating means and the table-top-locking means, adapted for releasing the latter when the pedestal-locking devices are released.

2. In combination with a pedestal extension table, a device for locking the two members of the pedestal together; an additional device for locking together the two members of the table top; means for operating the pedestal locking device and connections from said operating means to the table locking devices adapted for moving the latter to top-locking position by the pedestal-locking movement.

3. In combination with a pedestal extension table, a device for locking the two members of the pedestal together; an additional device for locking together the two members of the table top; means for operating the pedestal locking device and yielding connections from said operating means to the table locking devices adapted for moving the latter to top-locking position by the pedestal-locking movement.

4. In combination with a pedestal extension table, a device for locking the two members of the pedestal together; a latching device mounted on one pedestal member and an abutment on the other member adapted to be engaged thereby when the two members are spread a short distance to retain them against further spreading, the pedestal-locking devices being adapted for engagement for drawing the members together when they are spread to the extent permitted by said latching device.

5. In combination with a pedestal extension table, a step-by-step feeding device for connecting and drawing together the two pedestal members, comprising an element on each pedestal member adapted to become engaged when the pedestal members are somewhat separated, and means for back-and-forth movement of one of said elements for such step-by-step feeding action.

6. In combination with a pedestal extension table, a device for locking the two members of the pedestal together; an additional device for locking together the two members of the table top, comprising a latch mounted on one of the pedestal members and abutments on the two table top members adapted to be simultaneously engaged by the latch when said table-top members are closed together; means for operating the pedestal locking device and connections therefrom for operating said latch.

7. In combination with a pedestal extension table, a device for locking the two members of the pedestal together; a latch mounted on one pedestal member and an abutment on the other pedestal member adapted to be engaged by the latch when the two members are somewhat separated to prevent their further separation and permit them to be closed together, the pedestal-locking device comprising two elements adapted to operate with step-by-step movement for feeding the two members toward each other and to be engaged for the first step of such feeding movement when said latch is engaged.

8. In a pedestal extension table, in combination with divided pedestal members, divided table top members movable relatively to their respective pedestal members for extending the table without extending the pedestal; a locking device for drawing and locking the pedestal members together; coöperating devices on the pedestal and on the table top members for locking the latter with respect to the former at non-extended position, and connections from the pedestal locking device to the table top locking device for releasing the latter by the pedestal-lock-releasing action.

9. In a pedestal extension table, in combination with divided pedestal members, divided table top members; slides to which the pedestal members are attached; other slides to which the table top members are attached slidable relatively to the pedestal-carrying slides for extending the top; a locking device for drawing and locking the pedestal members together; coöperating devices on the pedestal and on the table top members for locking the latter with respect to the former in non-extended position, and connections from the pedestal-locking device to such top-locking device for releasing the latter by the pedestal-lock-releasing action.

10. In a pedestal extension table, in combination with the divided pedestal members, divided table top members movable relatively to the respective pedestal members for extending the top without extending the pedestal; pedestal locking devices; a yielding catch device comprising a pedestal-carried element and means for engagement therewith on the table top members respectively, and means operated by the pedestal locking devices for releasing said yielding catch device by the pedestal-lock-releasing action.

11. In a pedestal extension table, in combination with divided pedestal members, divided table top members movable relatively to the respective pedestal members for extending the top without extending the pedestal; a pedestal locking device; a latch carried by one of the pedestal members; means on the table top members for engagement with the latch to lock said top members together at closed position; connections from the pedestal locking device to said latch for moving the latter to locking position by the locking action of the pedestal lock; a spring in said connections for causing such top-locking movement of the latch to be yieldingly made, the latch and the engaging devices on the table top members being adapted for snap engagement with each other in the closing up movement of the top members when the latch has first been operated to top-locking position.

In testimony whereof, I have hereunto set my hand, in the presence of two witnesses, at Chicago, Illinois, this 6th day of May, 1907.

EMIL TYDEN.

In presence of—
J. S. ABBOTT,
M. GERTRUDE ADY.